United States Patent [19]
Fleming

[11] Patent Number: 5,976,669
[45] Date of Patent: Nov. 2, 1999

[54] RETROREFLECTIVE ARTICLE HAVING LAUNDERABLY DURABLE BEAD-BOND

[75] Inventor: Robert J. Fleming, Lake Elmo, Minn.

[73] Assignee: 3M Innovative Properties Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/777,718

[22] Filed: Dec. 20, 1996

[51] Int. Cl.⁶ .................... G02B 5/128; C08G 18/08
[52] U.S. Cl. .................... 428/143; 428/913; 428/325; 428/425.6; 264/1.9; 427/163.4; 528/28; 528/26; 528/44; 528/49; 528/59; 528/66; 525/440; 525/457; 359/539
[58] Field of Search ................. 428/913, 143, 428/325, 425.6; 264/1.9; 427/163.4; 528/28, 26, 44, 49, 59, 66; 525/440, 457; 359/539

[56] References Cited

U.S. PATENT DOCUMENTS

| | | | |
|---|---|---|---|
| 3,632,557 | 1/1972 | Brode et al. | 260/77.5 |
| 3,700,305 | 10/1972 | Bingham | 350/105 |
| 3,758,192 | 9/1973 | Bingham | 350/105 |
| 3,979,344 | 9/1976 | Bryant et al. | 260/18 |
| 4,222,925 | 9/1980 | Bryant et al. | 260/37 |
| 4,345,053 | 8/1982 | Rizk et al. | 525/440 |
| 4,396,681 | 8/1983 | Rizk et al. | 428/423.1 |
| 4,495,061 | 1/1985 | Mayer et al. | 208/89 |
| 4,533,592 | 8/1985 | Bingham | 428/213 |
| 4,576,850 | 3/1986 | Martens | 428/156 |
| 4,725,494 | 2/1988 | Belisle et al. | 428/325 |
| 4,763,985 | 8/1988 | Bingham | 350/105 |
| 4,889,903 | 12/1989 | Baghdachi | 528/17 |
| 4,916,199 | 4/1990 | Bandlish et al. | 528/28 |
| 5,128,804 | 7/1992 | Lightle et al. | 359/515 |
| 5,200,262 | 4/1993 | Li | 428/266 |
| 5,338,595 | 8/1994 | Li | 428/143 |
| 5,378,520 | 1/1995 | Nagaoka et al. | 428/72 |
| 5,422,162 | 6/1995 | Passarino et al. | 428/143 |
| 5,451,447 | 9/1995 | Li | 428/143 |
| 5,474,827 | 12/1995 | Crandall et al. | 428/67 |
| 5,478,596 | 12/1995 | Gurney . | |
| 5,552,449 | 9/1996 | Sollers et al. | 521/155 |
| 5,645,938 | 7/1997 | Crandall . | |
| 5,670,599 | 9/1997 | Bassner | 528/59 |

FOREIGN PATENT DOCUMENTS

| | | | |
|---|---|---|---|
| 2-54922 | 11/1990 | Japan | G02B 5/128 |
| WO 96/16343 | 5/1996 | WIPO | G02B 5/128 |
| WO 96/20967 WIO | 7/1996 | WIPO | G08G 18/22 |
| WIO 97/10279 | 3/1997 | WIPO | C08G 18/76 |

OTHER PUBLICATIONS

Arenivar, John D., *Viscosity Control of Curing Elastomers Using BiCAT® Catalysts*, Shepherd Chemical Company, Cincinnati, OH (Jul. 1996).
Red Kap Industries Technical Information Bulletin RK–66, *Enhanced Visibility Trim–Recommendations for Care and Maintenance*.
ASTM Designation: E 810–94 (revision of ASTM E 810–93b), *Standard Test Method for Coefficient of Retroreflection of Retroreflective Sheeting*.
British Standard BS EN 471:1994, Specification for High––Visibility Warning Clothing.
3M Product Brochure for *Scotchlite™ Industrial Wash Reflective Fabric, 9910 Silver* (1995) 75–0500–1007–5(35 15)R2.
Goodyear Product Literature for Vitel® and Flexclad® Tech Facts (Mar. 1987).
Bostik Product Literature for VITEL 3550B Vitel® Resins (Feb. 1997).

*Primary Examiner*—William P. Watkins III
*Attorney, Agent, or Firm*—William G. Ewert; Karl G. Hanson

[57] ABSTRACT

A retroreflective article (10) has retroreflective elements (12) partially embedded in a binder layer (14) that contains a solid polyurethane. The polyurethane includes soft segments, hard segments, silicon moieties, and urethane moieties. The specific chemical identities and relative amounts of the segments and moieties are sufficient to impart desired high elongation and low modulus to the polymer. The inventive retroreflective article is capable of demonstrating extraordinary laundering durability under industrial wash conditions and tumble and tunnel drying.

29 Claims, 1 Drawing Sheet

RETROREFLECTIVE ARTICLE HAVING LAUNDERABLY DURABLE BEAD-BOND

This invention relates to retroreflective materials or articles, such as fabric or sheeting that can be attached to garments to enhance nighttime visibility of the wearer. In another aspect, the invention relates to articles comprising retroreflective elements, e.g., transparent microspheres or beads with hemispheric reflectors, partially embedded in a layer of a binder, e.g., polyurethane. In other aspects, this invention relates to polyurethanes, particularly silicon-containing, moisture-cured polyurethanes, useful as such a binder, to methods of making polyurethanes, and to the use of polyurethanes as bead-bond binders to make retroreflective articles which are to be laundered.

In order to improve visibility or safety of pedestrians, joggers, workers on roadways, etc., retroreflective markings have been attached to their clothing to reflect light back in the direction of the incident light beam or source, such as that of automobile headlights, so that the presence of such persons are highlighted or made conspicuously visible to prevent them from being struck by an oncoming vehicle. Such retroreflective articles are described, for example, in U.S. Pat. No. 5,200,262 (Li), International Pat. Appln. published as WO 96/16343, and U.S. Pat. No. 5,474,827 (Crandall et al.). As stated in the latter reference, a retroreflective article typically comprises a layer of optical elements, a polymeric binder layer, and a specular reflective layer. The optical elements usually are transparent microspheres that are partially embedded in the polymeric binder layer (or bead-bond), and the specular reflective layer is disposed beneath the embedded portion of the microspheres.

Other patents describing retroreflective articles include U.S. Pat. No. 3,758,192 (Bingham), U.S. Pat. No. 4,533,592 (Bingham), U.S. Pat. No. 4,576,850 (Martens), U.S. Pat. No. 4,725,494 (Belisle et al.), U.S. Pat. No. 4,763,985 (Bingham), and U.S. Pat. No. 5,378,520 (Nagaoka et al.). The binders for the retroreflective elements are described in several of these patents as certain polyurethanes, e.g., polyurethanes made or used with coupling agent or adhesion promoter, such as isocyanate-functional silane (see said U.S. Pat. Nos. 5,200,262 and 5,474,827 and International Pat. Appln. WO 96/16343). Certain silicon-containing polyurethanes are also described in U.S. Pat. No. 3,632,557 (Brode et al.), U.S. Pat. No. 3,979,344 (Bryant et al.), U.S. Pat. No. 4,222,925 (Bryant et al.), U.S. Pat. No. 4,345,053 (Rizk et al.), U.S. Pat. No. 4,396,681 (Rizk et al.), U.S. Pat. No. 4,889,903 (Baghdachi et al.), U.S. Pat. No. 5,200,262 (Li), and International Pat. Appln. WO 96/20967.

The European Committee for Standardization published a standard or specification for "high-visibility warning clothing." The English language version of this standard is British Standard BS EN 471:1994. Section 6.2.1 of the British Standard states that the coefficient of retroreflection R', for what is termed "separate-performance retroreflective materials," shall exceed 100 candelas per lux per square meter (cd/lx·m$^2$), when measured in a prescribed method.

Clothing having attached reflective materials is commonly laundered. U.S. Pat. No. 5,200,262 states that the loss of retroreflective elements or their degradation is particularly troublesome when such clothing is subjected to industrial laundering. And U.S. Pat. No. 5,474,827 points out that retroreflective articles must be able to withstand laundering conditions when used on clothing. Section 7.4.5.1 of said British Standard requires that test specimens of such material shall be washed in a prescribed manner and the retroreflectivity shall be measured after such washing to determine if it complies with the minimum requirement, namely., R' shall exceed 100 cd/lx·m$^2$.

A few retroreflective materials or products are commercially available, including retroreflective trim for garments that enhance the wearer's visibility as described in Technical Information Bulletin RK-66 of RedKap Industries, and Scotchlite™ 9910 Industrial Wash Reflective Fabric as described in Product Bulletin 75-0500-1007-51(3515)R$^2$ IL of the 3M Company. Though these products have found acceptance, they have some limitations: Bulletin RK-66 states that high alkalinity, high pH, and wash temperatures above 165° F. (74° C.), used in laundering the trim, affect the life of the trim, and fabric temperatures that do not exceed 280° F. (138° C.) should be used in tunnel finishing the trimmed garments. And the bulletin on the Scotchlite 9910 fabric also states that low to medium alkaline, high-surfactant detergents are preferred in the industrial wash of the fabric, and in tumble or tunnel dry of the fabric the fabric temperature should not exceed 280° F. (138° C.).

The present invention provides, in one aspect, a silicon-containing, solid polyurethane polymer, useful as a polymeric binder for a retroreflective article or material, such as a fabric or sheeting, comprising a monolayer of retroreflective optical elements or lenses (such as transparent or light-transmissible microspheres or beads coated with specular reflective metal to provide them with hemispheric reflectors) partially embedded in (and thus exposed or protruding from) the top or first surface of a binder or "bead-bond" layer comprising the polyurethane polymer. The polymer comprises: a plurality of soft (flexible) segments such as those of (a) a segment comprising polyvalent ester or polyester moieties, e.g., (—R$^1$—C(O)O—)$_n$, where R$^1$ can be an alkylene, such as pentamethylene, and n can be 1 to 5 or higher, and/or (b) a segment comprising poly (alkoxy) moieties, (—R$^2$—O—)$_m$, where R$^2$ can be an alkylene such as tetramethylene, and m can be 2 to 5 or higher; a plurality of hard (rigid) segments such as those comprising one or more polyvalent carbocyclic groups, e.g., divalent phenylene, —C$_6$H$_5$—, or cyclohexylene, —C$_6$H$_{10}$—; a plurality of silicon moieties, or siloxy moieties, and a plurality of urethane (or carbamato) moieties, —N(H)C(O)—. The soft segments in a polymer can be the same or different, as is also true of the hard segments. The polymer can be made from a low solvent or essentially solvent-free (or "100% solids") liquid or coatable reaction mixture that can be processed (e.g., coated on a substrate) as such in making the bead-bond of retroreflective articles. The polymer is solidified or crosslinked upon exposure to ambient air or moisture-containing atmosphere and upon standing (aging or curing), and the polymer thus may also contain a very small amount of a plurality of urea (or ureylene) moieties, —N(H)—(O)—N(H)—, and/or a small amount of a plurality of hydrolyzed siloxy moieties, The specific chemical identities and relative amounts of said soft and hard segments and silicon and urethane moieties are sufficient to impart desired high elongation and low modulus to the polymer, so that a test specimen of the polymer, like a strip or film, can be pulled by hand to more than twice its length without breaking. Generally such elongation at break will be greater than 500% and preferably will be at least 750%, and the Young's modulus and 100% modulus will be less than 10 MPa, preferably less than 2 MPa, as measured on a test film of the polyurethane. Such properties may impart laundering durability to the polyurethane when it is used as a bead-bond for the retroreflective article. During laundering—which may be under home laundering conditions or, more importantly, industrial laundering conditions—the article can be subjected even to relatively severe or harsh chemical and temperature conditions, for example, high alkalinity (pH of 11 or higher) during washing (particularly when sodium hydroxide and potassium hydroxide-based detergents are used), high fabric temperatures during drying such as at the high tunnel temperatures of 350° F. (177° C.) of industrial laundering, and subjected as well as to the repeated impact forces imparted by tumbling which tends to dislodge the retroreflective elements from the binder layer. And during such laundering, the article can substantially retain its integrity (will not degrade). The elongation and modulus of the so-laundered polyurethane polymer can be substantially unaffected, with significant retention of the retroreflectivity of the retroreflective article after repeated industrial laundering of the article (e.g., 5 to as many as 40 or more laundering cycles). The degree of retention of retroreflectivity, that is, laundering durability, may vary, depending on the particular polyurethane formulation and whether tumble drying or the more efficient and higher temperature, tunnel drying is used in laundering. Such laundering durability can be obtained without the need to incorporate thermal stabilizers in the polymer or binder formulations.

The above-described article can be fabricated by a method in which the polyurethane polymer is made by a "prepolymer" technique, such method comprising (1) partially embedding a monolayer of retroreflective optical elements or microspheres in the top or first surface of a coated layer comprising: a mixture of (a) an isocyanate-terminated urethane prepolymer of a polyol comprising a plurality of soft segments, e.g. polyvalent polyester moieties and/or polyvalent polyalkoxy moieties, and a plurality of hard segments, e.g. polyvalent carbocyclic groups, with urethane moieties linking the hard and soft segments; (b) chain-extenders, such as alkoxylated bisphenol A diol and low molecular weight polyol; and (c) isocyanatosilane or mercaptosilane; and (2) exposing the resulting embedded layer to ambient air (viz., moisture-containing atmosphere) and letting it stand (or age) over a sufficient period of time (e.g., 2 to 6 weeks) to form from the mixture a binder layer comprising silicon-containing crosslinked polyurethane. The specific chemical identities and relative amounts of the segments and the silicon and urethane moieties in the polyurethane are sufficient to impart desired high elongation (e.g., greater than 500%) and low modulus (e.g., Young's modulus and 100% modulus of less than 10 MPa, preferably less than 2 MPa) to the polyurethane, thereby rendering it laundry durable, which is manifested by the substantial retroreflectivity of the article after many repeated launderings or wash-drying cycles, e.g., 5 to 15 or even in some cases up to 40 or more.

An example of the silicon-terminated polyurethane of this invention is that formed by an essentially solvent-free method of mixing (1) an isocyanate-terminated urethane prepolymer made by condensation polymerization of a polyol, such as a poly(caprolactone)-poly(tetramethylene oxide)-poly(caprolactone) block copolymer diol, and a carbocyclic polyisocyanate, such as methylene bis(4-cyclohexylisocyanate), with (2) a mixture of an ethoxylated bisphenol A diol, a low molecular weight polyol such as trimethylolpropane or ethoxylated trimethylopropane (MW 267), and an isocyanatosilane, such as triethoxyisocyanatosilane, or a mercaptosilane, and allowing the resulting reaction mixture, after shaping or coating the same in ambient air or in the presence of moisture-containing atmosphere, to cure and to form a silicon-containing, chain-extended, crosslinked, solid polyurethane useful as a binder or "bead-bond" for retroreflective elements.

The silicon-containing polyurethane of this invention also can be made by a "one-shot" (or single step) technique by directly mixing the isocyanto- or mercaptosilane with the precursors of the hard and soft segments and urethane linking groups, namely, polyol, polyisocyanate, and chain-extenders. The ensuing reaction is relatively fast upon mixing and is carried out in the presence of catalyst to promote urethane bond-forming.

Generally, the amount of hard segments in the polyurethane polymer can be in the range of 15 to 85 percent by weight, preferably 20 to 65 percent by weight, based on the weight of the polymer. The desired amount of hard segments can be calculated by dividing the weight (divisor) of the polymer into the sum (dividend) of the amount of isocyanate and chain-extender reactants, and multiplying the resulting remainder by 100. Generally, the desired amount of soft segments in the polyurethane polymer can be in the range of 15 to 85 percent by weight of the polymer. Generally, the total amount of hard and soft segments will be at least 80 percent by weight, preferably 90 to 99 percent by weight, by weight of the polymer.

In making a retroreflective article of this invention, such as a retroreflective fabric, the above-described reaction mixture of the prepolymer technique or one-shot technique can be coated in ambient air onto a monolayer of glass retroreflective elements and the coated layer rolled up and allowed to stand or age to solidify and effect cure of the coated reaction mixture. The resulting polyurethane-bonded retroreflective elements, attached to a suitable backing, such as a sheet or piece of polyester fabric, can be cut from the roll into strips and sewn or otherwise attached as a safety or warning means to a substrate or fabric of a garment, such as a roadworker or jogger vest of a polyester/cotton blend, to impart enhanced nighttime visibility to the wearer upon being illuminated by the headlights of an automobile.

In the accompanying drawing:

FIGS. 1–3 are schematic and are not drawn to scale.

Figure 1:
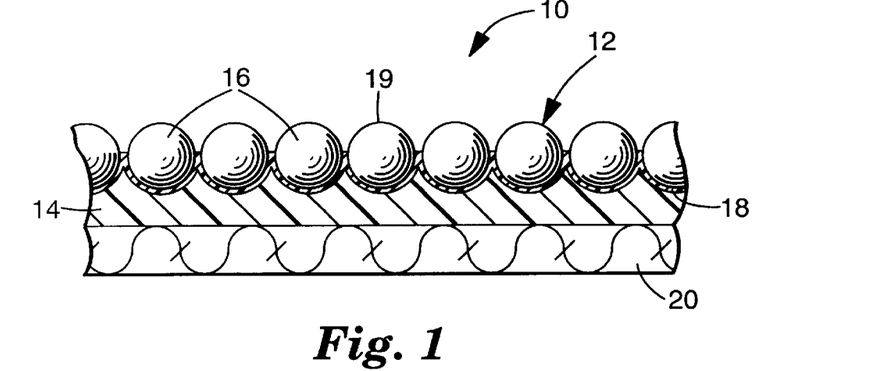
FIG. 1 is a view in elevation and partial cross-sectional of one embodiment of a retroreflective article of the present invention.

Referring to the drawing, FIG. 1 illustrates a retroreflective article 10 that includes a layer of a plurality of retroreflective elements 12 partially embedded in the top or a first surface of a binder layer or "bead-bond" 14. Each of the retroreflective elements 12 includes optical element in the form of a transparent microsphere or bead 16 and a specularly reflective layer 18. Light that strikes the front or exposed top 19 of the retroreflective article passes through the microspheres 16 and is reflected by reflective layer 18 to again re-enter the microspheres where the light's direction is again altered to return a substantial quantity of the incident light towards the light source. A layer of fabric 20, such as polyester, is bonded to the opposite side or second surface of the binder layer 14 to increase the structural integrally of the article 10. The article 10 may be applied or affixed, e.g., sewn, as a trim to a substrate (not shown), such as a garment, e.g., a vest.

Figure 2:
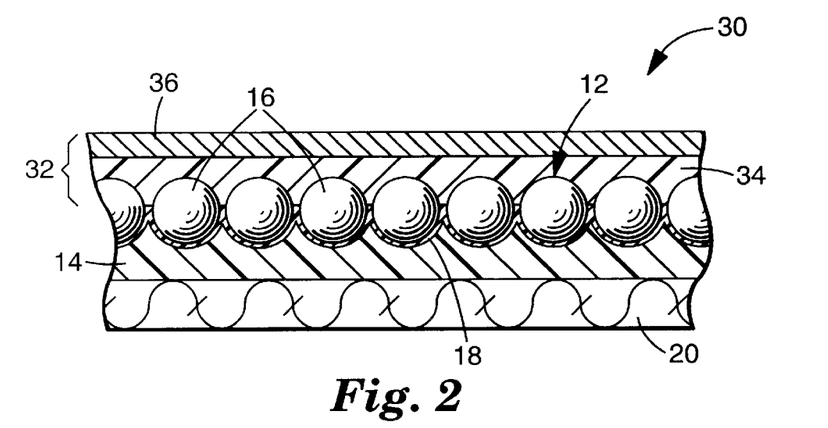
FIG. 2 is a view in elevation and partial section of an article that can be used to form the retroreflective article of FIG. 1.

Retroreflective article 10 can be made by first forming article 30 shown in FIG. 2. In forming article 30, a multitude of the retroreflective elements 12 are partially embedded in carrier web 32 which comprises a heat-softenable polymer layer 34 and paper sheet 36. Embedding the retroreflective elements can be accomplished by cascading transparent microspheres 16 onto a carrier web 32 in a desired temporary arrangement. Microspheres 16 preferably are packed as closely as possible on the carrier web 32, and may be so arranged by any convenient process, such as printing, screening, cascading, or with a hot can roll. Examples of useful polymer layers 34 for carrier web 32 include polyvinyl chloride, polyolefins, such as polyethylene, polypropylene, and polybutylene, and polyesters. Methods of applying microspheres to such a carrier web are described, for example, in U.S. Pat. No. 4,763,985 (Bingham), U.S. Pat. No. 5,128,804 (Lightle et al.), and U.S. Pat. No. 5,200,262 (Li), which descriptions are incorporated herein by reference.

Polymer layer 34 retains microspheres 16 in the desired arrangement. Depending in part on the characteristics of the carrier web 32 and microspheres 16, it may be desirable to condition carrier web 32 and/or microspheres 16 by applying selected release agents or adhesion promoters to achieve desired carrier release properties.

A reflective layer 18 is applied to carrier web 32 on the surface from which the microspheres protrude. The size of the retroreflective elements 12, as indicated by the portion of the microspheres covered with the reflective layer 18, may be controlled in part by controlling the depth to which the microspheres 16 are embedded in the carrier web. After retroreflective elements 12 are created, the binder layer 14 can be formed on the specularly reflective layer to produce article 30.

The binder layer 14 can be formed over the reflective layer 18 by mixing the prepolymer, chain extenders, and silane reactants together and quickly coating them over the reflective layer 18. The resulting coating can be heated to about 25 to 150° C. to increase the rate of reaction. Preferably, the coated mixture is heated to 35 to 120° C., and more preferably 40 to 110° C. The heating step enables a polyurethane binder layer to be formed that has superior resiliency, allowing the article to demonstrate extraordinary laundering durability. Additional layers of polyurethane polymer can be formed over the reflective layer as so desired to form the binder layer. Further, a fabric 20 can be adhered to the binder layer by placing it on the coated mixture before the polymer is fully reacted. After the binder layer has been formed, the carrier web 32 can be separated from article 30 to produce a retroreflective article 10 of the invention.

The retroreflective articles of this invention may be applied to substrates using mechanical methods such as sewing. In some applications, however, it is desired to secure the article to the substrate by an adhesive layer (not shown) with or without fabric layer 20. The adhesive layer may be a pressure-sensitive adhesive, a heat-activated adhesive, or an ultraviolet-radiation-activated adhesive. The substrate bearing the retroreflective article can be located on the outer surface of an article of clothing, enabling the retroreflective article to be displayed when the clothing is worn in its normal orientation by the wearer. The substrate may be, for example: a woven or nonwoven fabric such as a cotton fabric, a polymeric layer such as a layer of nylon, polyolefin, polyester, cellulosic, urethane, vinyl, acrylics, and rubber, leather, and the like.

Figure 3:
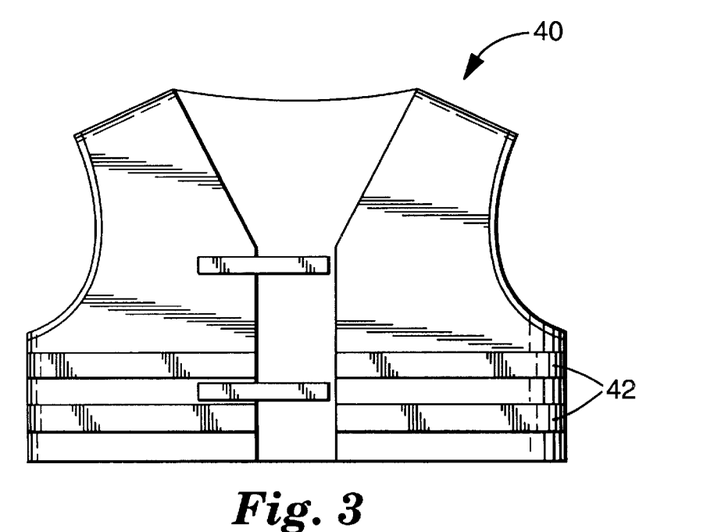
FIG. 3 is a view that illustrates an article of clothing (e.g., a roadworker's vest) having affixed thereto as a trim a retroreflective article of this invention such as that of FIG. 1.

FIG. 3 illustrates a safety vest 40, displaying a retroreflective article 42 in the form of an elongated sheeting, strip, or trim. Safety vests often are worn by road construction workers to improve their visibility to oncoming motorists. These kinds of vests frequently come into contact with dirt and grime, and therefore the retroreflective article must be able to withstand harsh cleaning or laundering conditions so that the vest can be reused a number of times. The retroreflective sheeting of this invention allows this kind of cleaning to be accomplished. Although a safety vest 40 has been chosen for illustration, the article of clothing of the invention can be in a variety of forms. As the term is used herein, "article of clothing" or "garment" means a launderable item of wearing apparel sized and configured to be worn or carried by a person. Other examples of articles of clothing that may display retroreflective articles of the invention include shirts, sweaters, jackets, coats, pants, shoes, socks, gloves, belts, hats, suits, one-piece body garments, bags, and backpacks.

Except for the particular binder layer 14 mentioned in the above description of the drawing, the retroreflective articles are known—see, for example, said International Pat. Appln. WO 96/16343.

The binder layer of the retroreflective articles of this invention can be derived from an isocyanate-terminated polyurethane prepolymer that is a reaction product of (i) a polyol which provides requisite soft segments, such as a polyester-polyalkoxy-polyester ABA block copolymer polyol, preferably one having a number average molecular weight of at least 2,000, and (ii) a carbocyclic polyisocyanate, such an aromatic or cycloaliphatic diisocyanate which provides requisite hard segments. The prepolymer contains urethane groups, —N(H)C(O)—, which form when the hydroxyl groups of the polyol react with some of the isocyanato groups of the polyisocyanate. The isocyanate-functional polyurethane prepolymer is then mixed with aromatic or cycloaliphatic polyol chain-extender which provides further hard segments, a low molecular weight triol chain-extender, and mono- or poly(alkoxy) isocyanato-silane or mercapto-silane. A catalyst also may be added to the resulting reaction mixture to promote the cure of the resulting reaction mixture to form a cross-linked, silicon-containing, polyurethane polymer.

In order to have sufficient time to process the reaction mixture that forms the polyurethane bead-bond, a delay catalyst can be incorporated into the reaction mixture. Such catalyst will cause the viscosity of the reaction mixture, after it is coated as a bead-bond or binder layer, to slowly rise over period of time, e.g. up to 20 minutes, to permit continuous producing or processing of a uniform, solvent-free (or 100% solids) polyurethane coating and then quickly cause the layer to rise in viscosity and effect cure at elevated tem- perature of the reaction mixture. Delay catalyst suitable for this purpose are zinc and bismuth carboxylates, as described in more detail hereinafter.

The polyols that are used to form the polyurethane polymer of this invention are isocyanate-reactive and may have a hydroxyl functionality up to about 4 or higher but preferably have a functionality from about 2 to 4. The polyols preferably are diols, triols, or mixtures thereof The polyols preferably have a number average molecular weight of 800 to 10,000, more preferably 1,000 to 6,000, and even more preferably 1,500 to 3,000. Such polyols can be represented by the formulas:

I

II where Y is the active hydrogen-free residue, e.g., —O(CH$_2$)$_4$O—, of a low molecular weight, active-hydrogen compound, such as a polyhydroxyalkane, e.g., butane diol or trimethylol propane, (A)$_a$ is a polyester moiety, A is an ester moiety, —R—C(O)O—, (B)$_b$ is a poly(alkoxy) moiety, B is an alkoxy moiety, —R—O—, each of a, b, and c is zero, or a higher number, e.g., up to 10, or 1 but the sum a+b+c is at least 1, and p is equal to the number of active hydrogen atoms in said low molecular weight compound and is generally 2 to 6. The polyol reactant preferably used is a polyester polyol and it may as well contain polyalkoxy moieties. Such preferred reactant can be like that of formula I where subscript a is at least 1 or like that of formula II where subscript b is at least 1. An example of such polyol is the poly(caprolactone)-poly(tetramethylene oxide) block copolymer diol which can be represented by formula:

III where x=y=7, w=z=4, and Y' is the hydrocarbon residue of a low molecular weight diol, e.g., butane diol. Other polyols which can be used as the soft segment precursor are described in said U.S. Pat. No. 4,576,850 (Martens), which description is incorporated herein by reference.

An example of a commercially available diol that may be used in making the prepolymer is that sold as Terathane™ CL polyester glycol having a molecular weight of about 2000 and a hydroxyl number of 56.6. Other commercially available polyols which can be used to make the polyurethane of this invention are Terathane™ 2000 poly(tetramethylene glycol), Acclaim™ 8200 poly(propylene oxide), and Tone™ 2241 poly(caprolactone).

The polyisocyanate used to make the polymer of this invention is preferably an aromatic polyisocyanate. Examples of aromatic polyisocyanates include toluene diisocyanate (TDI), methylene-bis(4-phenyl) isocyanate (also referred to as diphenyl methane diisocyanate or MDI), xylene diisocyanate, and polyphenylene polymethylene isocyanate (PMDI). Commercially available polyisocyanates which can be used include Mondur™ ML isomeric mixture of diphenylmethane diisocyanates, Desmodur™ W dicyclohexylmethane4,4'-diisocyanate, Desmodur™ CB-75N aromatic polyisocyanate adduct based on toluene diisocyanate and dissolved in ethyl acetate, and Hylene™ PPDI p-phenylene diisocyanate. Other polyisocyanates which can be used as hard segment precursors are those described in said U.S. Pat. No. 4,576,850.

Alternatively, instead of making an isocyanate prepolymer and then mixing it with the chain-extender and silane materials, commercially-available prepolymers can be mixed with these materials, such as Adiprene™ 150 and Versathane™ SME 90A prepolymers, derived from 1000 MW poly(tetramethylene glycol) and para-phenylene or di-phenylene diisocyanate.

Useful chain extenders (or crosslinkers) that can be used to make the polymer of this invention include low molecular weight diols (e.g., diols with molecular weights of about 90 to 600) and triols, such as 1,6-cyclohexane dimethanol, 1,6-hexane diol, 2-methyl-1,3-propane diol, glycerine, and trimethylolpropane. High molecular weight products can be used as chain-extenders to make the polyurethane polymers of this invention, such as Dianol™ 265, Dianol™ 240/1, and SynFac™ 8009 ethoxylated bisphenol A products, Stepanpol PS 1752 and Stepanpol PS20-200A diethylene glycolphthalic anhydride-based polyester polyols, Poly THF™ poly(tetrahydrofuran), Voranol™ 234-630 triol, Rucoflex™ F-2300 polyester triol, and Tone™ 0305 poly(caprolactone) triol. The ethoxylated bisphenol A diol used to chain-extend the prepolymer is preferably said Dianol™ 265 diol, which has a molecular weight of 510 and a hydroxyl number of 220 mg KOH/g. Mixtures of chain-extenders can be used. Preferably, to obtain the desired high elongation in the polyurethane product used as a bead-bond, the chain-extender has a linear, saturated aliphatic chain containing one or more catenary ether oxygen atoms or ester moieties. Such preferred chain-extender is of relatively high molecular weight and it is preferably used in admixture with said low molecular diol or triol.

The polyol-polyisocyanate reaction mixture used to prepare the polyurethane polymer can have an isocyanato-to-hydroxyl ratio, NCO/OH, of 0.8/1 to 1.2/1, and superior industrial laundering durability performance of the polyurethane bead-bond can be obtained when the NCO/OH ratio used to make such polymer is less than stoichiometric, e.g. as low as 0.9/1. The total amount of chain extender to be used is relatively large for a chain-extender and is that amount sufficient to ensure the polyurethane has the desired high elongation. That amount is preferably about 1 to 50, more preferably about 10 to 40 weight percent, and even more preferably 15 to 35 weight percent, based on the weight of the polyol reactant(s) used.

A catalyst generally is preferably employed in the reaction mixture used to prepare the chain-extended polyurethane. Catalysts for the reaction of polyisocyanates and active hydrogen-containing compounds are well-known in the art; (see, for example, U.S. Pat. No. 4,495,061 (Mayer et al.)) such as organometallic compounds and amines. The organometallic compounds may be organotin compounds such as dimethyltin dilaurate, dibutyltin dilaurate, dibutyltin dimercaptide, dimethyltin dithioglycolate, and dioctyltin dithioglycolate. Catalyst which have been found in another aspect of this invention to aid processing of polyurethane reaction mixture (e.g., coating a layer without premature gelling or curing) in general as well of the silicon-containing polyurethanes of this invention by delayed catalytic activity are zinc carboxylate, bismuth carboxylate, and mixtures thereof Generally, the catalyst can be employed according to this invention in the reaction mixture at 0.005 to 0.30 weight percent thereof, preferably 0.01 to 0.20 weight percent, and more preferably 0.02 to 0.15 weight percent. Such catalysts and their use in producing sealant polyurethanes are described in said International Pat. Appln. WO 96/20967. Commercially-available catalysts of this type are the BiCat™ catalysts described in the product brochure, "Viscosity Control of Curing Elastomers Using BiCat® Catalysts," distributed in July, 1996, by the Shepard Chem. Co., Cincinnati, Ohio.

In addition to the above components, the reaction mixture used to prepare the polyurethane of this invention contains, as an adhesion promoter, hydrolyzable silanes that are isocyanato-functional or mercapto-functional, such as the products commercially available from Witco Chem. Co. as A-1310 isocyanatotriethoxysilane and A-189 mercaptopropyltrimethoxysilane. (The isocyanate functionality of the isocyanato-silane is not included in the calculation of the NCO/OH ratio of the polyurethane reaction mixture.) The amount of silane to be used is an amount sufficient to increase the adhesion of the polyurethane. Generally the amount will be 0.5 to 10 wt %, preferably 1 to 5 wt %, of the polymer.

Additionally, the silicon-terminated polyurethane binder layer may contain colorants (for example, pigments, dyes, metal flakes), fillers, stabilizers (for example, thermal stabilizers and antioxidants, such as hindered phenols, and light stabilizers, such as hindered amines or ultraviolet stabilizers), flame retardants, flow modifiers (for example, surfactants, and plasticizers). Care should be taken when selecting such additives because some may detrimentally affect laundering durability. Preferred colorants for articles having aluminum retroreflective layers include black dyes such as metal-azo dyes.

The binder layer typically is a continuous, fluid-impermeable, polymeric, sheet-like layer which has a thickness of about 1 to 250 microns. Preferably, the thickness is about 50 to 150 microns. Thicknesses less than 50 microns may be too thin to adhere to both the substrate and the optical elements, and thicknesses greater than 150 microns may unnecessarily stiffen the retroreflective sheeting or fabric and add to its cost.

As indicated above, retroreflective optical elements are supported by the binder layer to alter the direction of light. The optical elements can be microspheres that preferably are substantially spherical in shape in order to provide the most uniform and efficient retroreflection. The microspheres preferably also are substantially transparent so as to minimize absorption of light so that a large percentage of incident light is retroreflected. The term "transparent" is used herein to mean capable of substantially transmitting light. The microspheres often are substantially colorless but may be tinted or colored in some other fashion. The microspheres may be made from glass, a non-vitreous ceramic composition, or a synthetic resin. In general, glass microspheres are preferred because they tend to be less expensive, harder, and more durable than microspheres made from synthetic resins.

The microspheres typically can have an average diameter in the range of about 30 to 200 microns. Microspheres smaller than this range tend to provide lower levels of retroreflection, and microspheres larger than this range may impart an undesirably rough texture to the retroreflective article or may undesirably reduce its flexibility. Microspheres that can be used in the present invention typically have a refractive index of about 1.7 to about 2.0, the range typically considered to be useful in microsphere-based retroreflective products where the front surfaces of the microspheres are exposed to the ambient environment, namely, air.

As mentioned above, optical elements used in this invention can have a metal specular reflective layer disposed beneath the embedded portions of the optical elements to provide a multitude of retroreflective elements. Preferably, the metal reflective layer is disposed on the embedded or rear portions of the optical elements. The term "metal reflective layer" is used herein to mean a layer comprising elemental metal which is capable of reflecting light, preferably specularly reflecting light. The metal may be a continuous or semi-continuous coating produced by vacuum-deposition, vapor coating, chemical-deposition, or electroless plating. A variety of metals may be used to provide a metal specularly reflective layer. These include aluminum, silver, chromium, nickel, magnesium, and the like, in elemental form. Aluminum and silver are preferred metals for use in the reflective layer. It is to be understood that in the case of aluminum, some of the metal may be in the form of the metal oxide and/or hydroxide. Aluminum and silver metals are preferred because they tend to provide good retroreflective brightness. The metal layer should be thick enough to reflect incoming light. Typically, the metal reflective layer is about 5 to 150 nanometers thick. Although the reflective color of a silver coating can be brighter than an aluminum coating, an aluminum layer normally is more preferred because it can provide better laundering durability when adhered to a glass optical element.

In lieu of or in addition to a metal reflective layer, a dielectric mirror may be used as a specularly reflective layer. The dielectric mirror may be similar to known dielectric mirrors disclosed in U.S. Pat. Nos. 3,700,305 and 4,763,985 (Bingham).

Among the many compounds that may be used in providing transparent materials within the desired refractive index range are high index materials such as CdS and the like, and low index materials such as $Al_2O_3$, and the like.

EXAMPLES

Advantages and objects of this invention are further illustrated in the Examples set forth hereafter. It is to be understood, however, that while the examples serve this purpose, the particular ingredients and amounts used and other conditions recited in the Examples are not to be construed in a manner that would unduly limit the scope of this invention. The Examples selected for disclosure in here are merely illustrative of how to make various embodiments of the invention and how the embodiments generally perform.

The following test methods were used in the Examples.
Industrial Laundering Procedure Launderability of various retroreflection articles of this invention, prepared as described below, was evaluated in each Example by washing and drying a piece of fabric to which the retroreflective article was applied. The combined sequence of washing and drying is referred to as a laundering cycle. The samples were washed using a Milnor System 7 Washing Machine Model 30015M4G from Pellerin Milnor Corp. in accordance with Program No. 7 for heavily soiled, colored fabrics. Launderability was evaluated by washing and drying a piece of 100% cotton towel fabric to which the retroreflective article was sewn. The cleaning agents used were 90 ml of Lever Tech Ultra™, a detergent containing, by weight, approximately 10% potassium hydroxide, 25% potassium citrate, and 2% ethoxylated lauryl alcohol, and 120 ml of Lever Tech Booster™ (a pH builder containing 20% sodium hydroxide). The washer was loaded with enough pieces (approximately 80) of fabric (about 45 cm by 75 cm) to make a 28 pound (12.7 kg) load including from one to four pieces of fabric having several (typically about 5) retroreflective articles of the invention (about 5 by 15 cm in size) secured thereto.

In Program No. 7 the following steps are carried out to complete the washing portion of a laundering cycle.

TABLE 1

| Operation | Duration (minutes) |
|---|---|
| Suds | 15 |
| Flush | 2 |
| Suds | 8 |
| Suds Carryover | 2 |
| Hot Rinse | 5 |
| Split Rinse | 2 |
| Cold Rinse | 2 |
| Flush | 4 |
| Extract | 7 |
|  | 47 |

In the suds step, hot water, cold water, and the cleaning agents are introduced into the machine washing basket under agitation and the step is carried out at about 72° C. In the flush steps, hot water (at 72° C.) is added to the washing basket after the same amount of the cold water containing the cleaning agents is purged.

The rinse steps essentially are the same as the flush steps except the water becomes cooler. In the first rinse, the water is approximately 72° C., in the second rinse (split rinse), the water is approximately 46° C., and in the final cold rinse, the water is approximately 18° C. The washing basket is agitated during the flush and rinse steps. In the extract step, the machine undergoes a high-speed spin cycle to remove water from the washed samples.

Laundering durability was evaluated using on a set of duplicate retroreflective article samples, using two different drying procedures, tumble drying and tunnel finishing (drying). Tumble drying of some of the samples was performed in a Maytag™ home drier at 60° C. on regular setting for about 30–35 minutes. Tunnel finishing was simulated by hanging the other samples in a Despatch oven (style V-29 from Despatch Oven Co.) at 177° C. for 10 minutes. After drying, the coefficient of retroreflection, $R_A$, was measured. After the designated number of cycles, the retroreflective brightness of the middle of each sample was determined.

Retroreflective Brightness Test

The coefficient of retroreflection was measured in accordance with standardized test ASTM E 810-93b, and is expressed in candelas per lux per square meter, (cd/lx·m$^2$). The entrance angle used in ASTM E 810-93b was −4 degrees and the observation angle was 0.2 degrees. (Said entrance angle of −4 degrees gives results which are not significantly different than the entrance angle of +5 degrees used in said British Standard BS EN 471:1944).

Tensile Elongation and Modulus Tests

Tensile, elongation, and modulus tests of the polyurethanes described in the Examples were performed on a MTS (Materials Testing Systems) machine or an Instron Model 5565 machine. The polyurethane films were cut into 0.5 inch by 2-inch (1.3 cm×5.1 cm) strips and put into the grips of the machine set at a 1-inch (2.5 cm) gauge length. Tests were performed with a cross-head speed of 10 or 20 inches/minute (25 or 50 cm/min).

Examples 1–13

For each of the Examples, glass microspheres having an average diameter of about 40 to 90 micrometers were partially embedded in a carrier web. The carrier web contained juxtaposed paper and polyethylene layers, and the microspheres were embedded in the polyethylene layer. A specularly-reflective aluminum layer was vapor deposited over the protruding portions of the glass microspheres to form a monolayer of retroreflective elements. This embedded carrier web was used as the base for applying the bead bond formulation prepared as follows:

In Example 1, an amount of 19.4 grams (0.022 equivalents) of Terathane CL polyether glycol was heated in an oven to 50° C. and then 5.5 grams (0.044 equivalents) Mondur ML was added and then stirred. One drop (~0.03 grams) dibuyltindilaurate (DBTDL) was added to the resulting mixture and stirred. The resulting reaction mixture was allowed to react for 30 minutes while maintaining its temperature at 50° C., with occasional stirring. A mixture of 2.5 grams cyclohexanone, 2.5 grams methyl ethyl ketone, and 0.9 gram of triethoxyisocyanatosilane was then added to the resulting prepolymer and stirred. A chain-extending mixture of 0.2 gram Irganox 1010 catalyst, 0.45 gram trimethylolpropane, and 2.78 grams of Dianol 265 diol were dissolved into 5.0 grams of methyl ethyl ketone; the resulting solution was then added to the prepolymer and stirred, producing a bead-bond formulation.

In Example 1, the retroreflective fabric was made by notch-bar coating 8 mils (0.20 mm) of the above-described bead-bond formulation or reaction product onto Scotchlite™ 5710 vapor coat carrier web. The construction was then cured 3 minutes in ambient air at 65° C.; the fabric was then put on top of the bead-bond coating, and then the final construction was cured in ambient air 20 minutes at 105° C. The carrier web was stripped away after 6 days to yield an exposed lens, industrial launderable, retroreflective fabric. For physical measurements, films of the bead-bond formulation were made by coating 10 mils (0.25 mm) of the formulation onto silicon release liner and curing 3 minutes at 65° C. and 20 minutes at 105° C.

Industrial laundering was performed 6 weeks after the retroreflective articles were made or aged.

In Table 2, the formulation of the polyurethane of Example 1 is summarized together with physical properties of the film of the polyurethane, the initial coefficient of retroreflection measurement (558 cd/lx·m$^2$) made before the first laundering of the retroreflective article, and the number (21) of laundering cycles performed before the retroreflectivity measurement after laundering fell below the minimum requirement of 100 cd/lx·m$^2$ of the British Standard. Table 2 also sets forth similar data for the similarly prepared polyurethane films and retroreflective articles of Examples 2–4, 6–13. In Example 5 (also summarized in Table 2), however, the polyurethane polymer was prepared by the one-shot technique by mixing 19.4 g Terathane CL polyol, 0.03 g DBTDL catalyst, 2.5 g cyclohexanone, 5.5 g methyl ethyl ketone, 0.2 g Irganox 1010 catalyst, 2.95 g Syn Fac 8009 polyol chain extender, and 0.89 g Voranol 234-630 polyol chain extender; then 5.1 g Mondur ML polyisocyanate and 1.0 g A-1310 silane were added, the resulting mixture stirred, coated, and cured as in Example 1.

TABLE 2

| | EXAMPLES | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Polymer Binder Formulation, g | | | | | | | | | | | | | |
| Terathane CL polyol | 19.4 | 19.4 | 0 | 0 | 19.4 | 19.4 | 19.4 | 19.4 | 19.4 | 19.4 | 19.4 | 19.4 | 19.4 |
| Terathane 2000 polyol | 0 | 0 | 22.0 | 0 | 0 | 0 | 0 | 0 | 0 | 0 | 0 | 0 | 0 |
| Tone 2241 polyol | 0 | 0 | 0 | 22.0 | 0 | 0 | 0 | 0 | 0 | 0 | 0 | 0 | 0 |
| Acclaim 8200 polyol | 0 | 0 | 0 | 0 | 0 | 0 | 0 | 0 | 0 | 0 | 0 | 4.6 | 0 |
| Mondur ML polyisocyanate | 5.5 | 5.1 | 5.1 | 5.1 | 5.1 | 5.1 | 5.0 | 0 | 5.5 | 6.88 | 5.1 | 5.1 | 5.1 |
| Desmodur W polyisocyanate | 0 | 0 | 0 | 0 | 0 | 0 | 0 | 5.28 | 0 | 0 | 0 | 0 | 0 |
| DBTDL catalyst | 0.03 | 0.03 | 0.03 | 0.03 | 0.03 | 0.03 | 0.03 | 0.03 | 0.03 | 0.03 | 0.03 | 0.05 | 0.03 |
| Cyclohexanone | 2.5 | 2.5 | 2.5 | 2.5 | 2.5 | 2.5 | 2.5 | 0 | 2.5 | 2.5 | 2.5 | 0 | 2.5 |
| Methyl ethyl ketone[a] | 2.5 | 2.5 | 2.5 | 2.5 | 2.5 | 5.5 | 2.5 | 0 | 2.5 | 2.5 | 2.5 | 0 | 2.5 |
| Methyl ethyl ketone[b] | 5.0 | 5.0 | 5.0 | 5.0 | 5.0 | 0 | 5.0 | 0 | 5.0 | 5.0 | 3.0 | 3.0 | 5.0 |
| Iraganox 1010 stabilizer | 0.2 | 0.2 | 0.2 | 0.2 | 0.2 | 0.2 | 0.2 | 0 | 0.2 | 0.2 | 0.2 | 0.28 | 0.2 |
| Butanediol | 0 | 0 | 0 | 0 | 0.54 | 0 | 0 | 0 | 0 | 0 | 0 | 0 | 0 |
| Syn Fac 8009 polyol | 0 | 2.95 | 2.95 | 2.95 | 0 | 2.95 | 3.3 | 3.13 | 0 | 0 | 2.95 | 2.95 | 0 |
| Voranol 234-630 polyol | 0 | 0.89 | 0.89 | 0.89 | 0.89 | 0.89 | 0.89 | 0 | 0 | 0 | 0.89 | 0.89 | 0.89 |
| Rucoflex F-2300 polyol | 0 | 0 | 0 | 0 | 0 | 0 | 0 | 1.82 | 0 | 0 | 0 | 0 | 0 |
| Dianol 265 polyol | 2.75 | 0 | 0 | 0 | 0 | 0 | 0 | 0 | 2.32 | 5.34 | 0 | 0 | 0 |
| Trimethylolpropane | 0.45 | 0 | 0 | 0 | 0 | 0 | 0 | 0 | 0.54 | 0.45 | 0 | 0 | 0 |
| Stepanol PS 1752 polyol | 0 | 0 | 0 | 0 | 0 | 0 | 0 | 0 | 0 | 0 | 0 | 0 | 3.89 |
| A-189 Mercaptosilane | 0 | 1.0 | 0 | 0 | 0 | 0 | 0 | 0 | 0 | 0 | 0 | 0 | 0 |
| A-1310 Tri-ethoxyiso-cyanotosilane | 0.9 | 0 | 1.0 | 1.0 | 1.0 | 1.0 | 1.0 | 1.05 | 0.9 | 1.0 | 1.0 | 1.0 | 1.0 |
| Physical Properties Cured Polymer | | | | | | | | | | | | | |
| Young's Modulus, psi (MPa) | — | 99.9[d] (0.689) | — | 153.4 (1.058) | 233.4 (1.610) | 186.8 (1.288) | — | 157.6 (1.087) | — | — | 176.2 (1.215) | 106.7 (0.736) | 160.7 (1.108) |
| 100% Modulus, psi (MPa) | — | 40.6[d] (0.280) | — | 65.5 (0.452) | 141.4 (0.9752) | 91.0 (0.628) | — | 63.8 (0.440) | — | — | 86.2 (0.5945) | 52.3 (0.361) | 79.5 (0.548) |
| Break stress, psi (MPa) | 956.6[d] | 265.6[d] | — | 341.0 | 756.8 | 316.9 | — | 460.3 | 2361.6[d] | 922.6[d] | 412.8 | 467.9 | 539.3 |
| Elongation at break, % | 701.3[d] | 1276[d] | — | 1286 | 1221 | 933.4 | — | 1994 | 746.9[d] | 649.3[d] | 1152 | 2038 | 1601 |
| Laundering Durability | | | | | | | | | | | | | |
| Initial retro-reflectivity, cd/lx · m² | 558 | 251 | 367 | 606 | 577 | 410 | 375 | 397 | 536 | 523 | 496 | 355 | 407 |
| Number of laundering cycles run with retro-reflectivity still exceeding 100 cd/lx · m², using | | | | | | | | | | | | | |
| Maytag drier | 5 | 18 | 10 | 12 | 8 | 6 | >40[c] | 11 | 4 | 3 | 5 | 4 | 7 |
| Tunnel drier | 21 | 3 | 15 | 14 | 15 | 14 | 11 | >15[c] | 17 | 21 | 15 | 14 | 15 |

[a] This ketone was used in prep. of the prepolymer, except in Example 5
[b] This ketone was used in prep. of the chain-extended prepolymer
[c] Laundering was discontinued after indicated number of laundering cycles even though retroreflectivity was still significantly greater than 100 cd/lx · m²
[d] These values were obtained with a cross-head speed of 10 in/min (25.4 cm/min) on the MTS machine.

The data of Table 2 show that various formulations of the polyurethane bead-bond of this invention exhibited laundering durability. Note that all the samples of the Examples had substantial retention of retroreflectivity. By comparison, a binder formulation that did not contain any silane resulted in a retroreflective article which had a retroreflectivity of less than 100 cd/lx·m² after only one laundering cycle. The samples of all the Examples also had low modulus (<10 MPa) and high elongation at break (>500%), which properties account, at least in part, for the bead-bonds of those samples withstanding the harsh or severe washing and drying laundering conditions stresses incurred during washing and drying. The data also show that amounts of the polyisocyanate and chain-extender, used to obtain desired high laundering durability in a particular type of drying (tumble or tunnel), can be varied (cf Examples 7 and 11). Such amounts can be readily found empirically. Too high amounts of chain extender and polyisocyanate has been found to result in a polyurethane with an elongation of less than 500% and a modulus of greater than 10 MPa, with consequent poor laundering durability, e.g., a retroreflectivity of less than 100 cd/lx·m² after one laundering cycle.

Example 14

Table 3 sets forth the formulations of two mixtures, M-1 and M-2, used to make a polyurethane bead-bond of this invention.

TABLE 3

| Mixture M-1 | Mixture M-2 |
|---|---|
| Terathane CL polyol, 16.227 Kg | Mondur ML polyisocyanate, 9.487 Kg |
| Voranol 2334-630 polyether triol, 0.74 Kg | A-1310 silane, 1.860 Kg |
| SynFac 8009 polyol, 2.46 Kg | |
| DBTDL catalyst, 6.1 g | |

Mixture M-1 was heated in a tank to 160° F. (71° C.) and Mixture M-2 was held in a tank at ambient temperature. Mixture M-1 was pumped at 71.5 g/min into a pin mixer and Mixture M-2 was pumped into the pin mixer at 19.51 g/min. The contents of the pin mixer, after mixing, were pumped from the pin mixer and fed onto a carrier web (like web 14 of FIG. 2) which was moving at 14 ft/min (4.3 m/min). A notched-bar set at 6 mils (152 microns) above the top surface of the web removed the excess reaction mixture to produce a bead-bond coating with a thickness of about 6 mils. The resulting coated web was then passed through 75 ft (22.9 m) of an air oven set at 210° F. (99° C.). Upon exiting the oven, a 100% polyester fabric was laminated onto the top surface of the bead-bond and the resulting construction was wound up into a roll. After about 1 week, the carrier (like carrier web 22 of FIG. 2) was stripped from the construction to produce a retroreflective fabric of this invention. Such article was industrially laundered similar to the laundering procedure described in Examples 1–13 and the retroreflectivity of the article was measured as described in those Examples. The initial retroreflectivity of the article was 482 cd/lx·m²; after 35 industrial laundering cycles using a Maytag (tumble) dryer, the retroreflectivity was 282 cd/lx·m²; and after 35 industrial laundering cycles using tunnel drying conditions, the retroreflectivity was 124 cd/lx·m². Such retroreflectivity measurements show that the bead-bond of the retroreflective article had very high, acceptable laundering durability.

Example 15

Another launderably durable retroreflective article of this invention was prepared in a manner like that of Example 14 using Mixtures M-3 and M-4 described in Table 3.

TABLE 3

| Mixture M-3 | Mixture M-4 |
|---|---|
| Terathane CL polyol, 15.99 Kg | Mondur ML polyisocyanate, 9.487 Kg |

TABLE 3-continued

| Mixture M-3 | Mixture M-4 |
|---|---|
| Voranol 2334-630 triol, 0.73 Kg | A-1310 silane, 1.860 Kg |
| SynFac 8009 polyol, 2.43 Kg | |
| Bicat 8 catalyst* | |
| Bicat Z catalyst* | |

*dissolved in 66.93 g of Santicizer 141 when added

The resulting retroreflective article had an initial retroreflectivity of 519 cd/lx·m² and was laundered, after aging 2 weeks in ambient atmosphere similar to that of Example 14. The retroreflectivity of the article after 25 industrial laundering cycles using a Maytag dryer was 250 cd/lx·m²; and after 2 laundering cycles using tunnel drying conditions, retroreflectivity of the article still exceeded 100 cd/lx·m².

Various modifications and alterations of this invention will be apparent to one skilled in the art from the description herein before without departing from the scope and spirit of this invention.

What is claimed is:

1. A retroreflective article adapted for use on clothing, which retroreflective article comprises:

a layer of retroreflective elements partially embedded in a binder layer that comprises a solid polyurethane comprising a plurality of soft segments, a plurality of hard segments, and a plurality of silicon moieties, wherein the soft segments comprise polyester units and poly (alkoxy) units, and wherein the specific chemical identities and relative amounts of the segments and moieties are sufficient to impart an elongation at break of at least 500% and a Young's modulus of less than 10 MPa to the solid polyurethane.

2. An retroflective article of clothing having affixed thereto the retroreflective article of claim 1.

3. The article of claim 1 wherein the soft segments comprise polyvalent polyester moieties and poly(alkoxy) moieties and the hard segments comprise carbocyclic groups.

4. The retroreflective article of claim 1 wherein the amount of hard segments is 15 to 85 percent by weight, the amount of soft segments is 15 to 85 percent by weight, and the total amount of the hard and soft segments being at least 80 percent by weight, the weights being based on the weight of the polyurethane.

5. The article of claim 1, wherein the soft segments comprise where w is 4 and y is 7, and the hard segments comprise diphenylene.

6. The retroreflective article of claim 1, wherein the polyurethane has an elongation at break of at least 750% and a Young's modulus of less than 2 MPa.

7. The retroreflective article of claim 1, wherein its retroreflectivity is greater than 100 cd/lx·m² and is substantially retained after being subjected to an Industrial Laundering Procedure at least 5 times.

8. A retroreflective article comprising a layer of retroreflective glass microspheres partially embedded in a binder layer comprising crosslinked, silicon-containing polyurethane polymer comprising a plurality of soft segments of where w is 4 and y is 7, a plurality of hard segments comprising diphenylene, a plurality of moieties, and a plurality of urethane moieties, the polymer having an elongation at break of at least 750 and a Young's modulus of less than 10 MPa, the article having a coefficient of retroreflectivity of at least 100 cd/lx·m².

9. A method of making a retroreflective article comprising partially embedding retroreflective elements in a binder layer comprising a mixture of polyol comprising a plurality of soft segments of polyvalent polyester moieties and polyvalent poly(alkoxy) moieties, a carbocyclic polyisocyanate, ethoxylated bisphenol A diol, low molecular weight polyol, and mercaptosilane or isocyanatosilane, and exposing the resulting embedded binder layer to ambient air to form from the mixture a silicon-containing crosslinker polyurethane, the specific chemical identities and relative amounts of the polyol, polyisocyanate, and silane being sufficient to impart an elongation at break of at least 500% and a Young's modulus of less than 10 MPa to the polyurethane.

10. The method of claim 9 wherein the soft segments are where w is 4 and y is 7.

11. The method of claim 10 wherein the mixture further comprises zinc carboxylate, bismuth carboxylate, or mixtures of the carboxylates as a catalyst.

12. A method of making a polyurethane, which method comprises.
   mixing together a combination that comprises (i) a prepolymer that is an isocyanate-terminated urethane polyol that comprises a plurality of soft segments of polyvalent polyester moieties and polyvalent polyalkoxy moieties; (ii) ethoxylated bisphenol A diol; (iii) low molecular weight polyol; and (iv) mercaptosilane or isocyanatosilane; and
   polymerizing the resulting mixture to form from the mixture a polyurethane that has an elongation at break of at least 500% and a Young's modules of less than 10 MPa.

13. A method of making a polyurethane, which method comprises;
   mixing together a combination that comprises (i) carbocyclic polyisocyanate, (ii) polyol comprising a plurality of soft segments of polyvalent polyester moieties and polyvalent polyalkoxy moieties, (iii) ethoxylated bisphenol A diol, (iv) low molecular weight polyol, and (v) mercaptosilane or isocyanatosilane, and
   polymerizing the resulting mixture to form from the mixture a polyurethane, the specific chemical identities and relative amounts of the segments being sufficient to impart to the polyurethane an elongation at break of at least 500% and a modulus of less than 10 MPa.

14. The method of claim 13, wherein the polyol is poly(caprolactone)-poly(tetramethylene oxide) block copolymer.

15. A retroreflective article that is adapted for use on clothing, which article comprises:
   (a) retroreflective elements that include a layer of transparent microspheres and a metal reflective layer, the metal reflective layer being disposed relative to the microspheres such that light passing through the microspheres is reflected by the metal reflective layer; and
   (b) a binder layer that comprises a polyurthane polymer that contains soft segments, hard segments, and silicon moieties, wherein the soft segments comprise blocks of polyester units and blocks of poly(alkoxy) units, the transparent microspheres being partially embedded in the binder layer.

16. The retroreflective article of claim 15, wherein the soft segments have a number average molecular weight of less than 10,000, and wherein the hard segments are derived from diols having molecular weights of less than 600.

17. The retroreflective article of claim 15, wherein the polyurethane polymer has an elongation at break of at least 500% and a Young's modulus of less than 10 MPa, and wherein the metal reflective layer comprises aluminum.

18. The retroreflective article of claim 1, wherein the soft segments comprise blocks of polyester units and blocks of poly(alkoxy) units.

19. The retroreflective article of claim 18, wherein the soft segments are in the form of an ABA or BAB block copolymer.

20. The method of claim 1, wherein the soft segments have a number average molecular weight of less than 10,000.

21. The retroreflective article of claim 1, wherein the solid polyurethane contains urethane groups —N(H)C(O)— that link the soft and hard segments together.

22. The retroreflective article of claim 1, wherein the soft segments have a number average molecular weight of 800 to 10,000.

23. The retroreflective article of claim 1, wherein the soft segments have a number average molecular weight of 1,000 to 6,000.

24. The retroreflective article of claim 1, wherein the soft segments have a number average molecular weight of 1,500 to 3,000.

25. The retroreflective article of claim 1, wherein the binder layer has a thickness of 50 to 150 microns, and the retroreflective elements include microspheres that have a metal reflective layer disposed thereon, the microspheres having an average diameter of about 30 to 200 microns.

26. The retroreflective article of claim 25, wherein the metal reflective layer contains aluminum or silver.

27. The retroreflective article of claim 1, wherein the retroreflective elements comprise a layer of optical elements and a metal reflective layer, the optical elements being partially embedded in the binder layer, and the metal reflective layer being disposed between the binder layer and the layer of microspheres, and wherein the soft segments in the polyurethane comprise blocks of polyester units and blocks of poly(alkoxy) units.

28. The retroreflective article of claim 1, wherein the polyurethane polymer contains 20 to 65 percent by weight hard segments and 15 to 85 percent by weight soft segments.

29. The retroreflective article of claim 1, wherein the total amount of hard and soft segments in the polyurethane polymer is at least 90 percent by weight of the polymer.

* * * * *

UNITED STATES PATENT AND TRADEMARK OFFICE
CERTIFICATE OF CORRECTION

PATENT NO.: 5,976,669

DATED: November 2, 1999

INVENTOR(S): Robert J. Fleming

It is certified that error appears in the above-identified patent and that said Letters Patent is hereby corrected as shown below:

Col. 2, line 66, "-(O)-" should read as -- -(C(O)- --.

Cols. 13 & 14, in Table 2, under the heading <u>Physical Properties Cured Polymer</u>, lines 45-46, in the section "Break stress, psi (Mpa)", please add the following numbers for Examples 1-13, respectively:

|  | | | | | | Examples | | | | | | |
|---|---|---|---|---|---|---|---|---|---|---|---|---|
| 1 | 2 | 3 | 4 | 5 | 6 | 7 | 8 | 9 | 10 | 11 | 12 | 13 |
| --(6.597) | (1.832) | — | (2.352) | (5.219) | (2.186) | — | (3.175) | (16.287) | (6.363) | (2.868) | (3.227) | (3.719)--. |

Col. 16, line 38, insert --retroreflective-- between "The" and "article".

Col. 16, line 48, insert --retroreflective-- between "The" and "article".

Col. 18, line 8, "polyurthane" should read as --polyurethane--.

Signed and Sealed this

Twenty-second Day of August, 2000

Attest:

Q. TODD DICKINSON

*Attesting Officer*   *Director of Patents and Trademarks*